US012796862B2

(12) United States Patent
McFadyen et al.

(10) Patent No.: US 12,796,862 B2
(45) Date of Patent: Nov. 17, 2026

(54) GRILL RACK SYSTEM AND METHOD

(71) Applicant: Pimp My Grill LLC, El Cajon, CA (US)

(72) Inventors: Eric Michael McFadyen, San Diego, CA (US); Ronald Smith, Lakeside, CA (US)

(73) Assignee: Pimp My Grill LLC, El Cajon, CA (US)

( * ) Notice: Subject to any disclaimer, the term of this patent is extended or adjusted under 35 U.S.C. 154(b) by 392 days.

(21) Appl. No.: 18/603,693

(22) Filed: Mar. 13, 2024

(65) Prior Publication Data

US 2024/0306849 A1 Sep. 19, 2024

Related U.S. Application Data

(60) Provisional application No. 63/490,096, filed on Mar. 14, 2023.

(51) Int. Cl.
*A47J 37/07* (2006.01)
*F24C 15/16* (2006.01)

(52) U.S. Cl.
CPC .... *A47J 37/0786* (2013.01); *A47J 2037/0795* (2013.01); *F24C 15/16* (2013.01)

(58) Field of Classification Search
CPC .......................... A47B 2088/401; A21B 3/155
See application file for complete search history.

(56) References Cited

U.S. PATENT DOCUMENTS

| | | | | | |
|---|---|---|---|---|---|
| 743,933 | A * | 11/1903 | Ruth et al. | F24C 1/04 | 126/39 M |
| 843,643 | A * | 2/1907 | Van Wie | F24C 3/027 | 126/21 R |
| 1,070,314 | A * | 8/1913 | Allen | F24C 15/16 | 126/339 |
| 1,600,699 | A * | 9/1926 | Parke | F24C 15/16 | 126/339 |
| 1,657,226 | A * | 1/1928 | Neldner | F24C 15/16 | 126/337 A |
| 1,772,699 | A * | 8/1930 | Baumann | A21B 3/155 | 160/397 |
| 1,896,307 | A * | 2/1933 | Hatch | F24C 15/16 | 126/339 |

(Continued)

FOREIGN PATENT DOCUMENTS

| | | | | |
|---|---|---|---|---|
| EP | 1748257 A2 * | 1/2007 | F24C 15/16 |
| EP | 2708129 A1 * | 3/2014 | A47J 37/01 |

(Continued)

*Primary Examiner* — Jorge A Pereiro
(74) *Attorney, Agent, or Firm* — Procopio, Cory, Hargreaves & Savitch LLP

(57) ABSTRACT

A grill rack system includes at least one grill rack, a left-hand grill bracket, and a right-hand grill bracket. In one embodiment, the grill brackets each include only one set bolt. In an alternative embodiment, each of the grill brackets includes at least one rack track guide defining a rack track guide opening. In an alternative embodiment, the grill rack includes at least one rear crossmember alignment tab. The grill brackets each include at least one rack track guide each defining rack track guide opening and each including the at least one alignment tab disposed in the at least one rack track guide.

16 Claims, 12 Drawing Sheets

(56) References Cited

U.S. PATENT DOCUMENTS

| | | | | | |
|---|---|---|---|---|---|
| 2,033,792 | A * | 3/1936 | Sywert | F25D 25/024 | D15/89 |
| 2,033,859 | A * | 3/1936 | Otte | F24C 15/168 | 126/339 |
| 2,237,102 | A * | 4/1941 | Hungerford | A21B 3/15 | 220/641 |
| 2,466,360 | A * | 4/1949 | Bitney | F24C 15/16 | 126/337 R |
| 2,580,153 | A * | 12/1951 | Birkic | F24C 15/16 | 126/37 R |
| 2,742,559 | A * | 4/1956 | Edelman | A47J 37/041 | 126/339 |
| 2,797,680 | A * | 7/1957 | Nagel | F24C 15/16 | 126/39 M |
| 2,841,132 | A * | 7/1958 | Philipp | F24C 15/007 | 126/39 M |
| 2,920,550 | A * | 1/1960 | Schmall | A47J 37/0814 | 99/329 R |
| 3,043,290 | A * | 7/1962 | Gibbons | F24C 15/16 | 248/245 |
| 3,100,435 | A * | 8/1963 | Mobley, Jr. | A47J 37/041 | 99/421 HH |
| 3,120,224 | A * | 2/1964 | Divelbiss | F24C 15/16 | 126/39 M |
| 3,151,608 | A * | 10/1964 | Hurko | F24C 15/007 | 126/39 M |
| 3,221,678 | A * | 12/1965 | Doherty | A47B 57/26 | 108/106 |
| 3,709,166 | A * | 1/1973 | Bush | A47B 57/26 | 108/106 |
| 3,771,466 | A * | 11/1973 | Ferdinand | A47B 57/42 | 248/200.1 |
| 3,976,000 | A * | 8/1976 | Oxel | A47J 37/0623 | 99/393 |
| 4,307,285 | A * | 12/1981 | DeRemer | A47J 37/0635 | 126/39 M |
| 4,476,848 | A * | 10/1984 | Protas | A21B 1/52 | 126/339 |
| 5,429,043 | A * | 7/1995 | Becker | F24C 15/16 | 99/450 |
| 5,819,639 | A * | 10/1998 | Spell | F24C 15/164 | 99/421 H |
| 6,148,813 | A * | 11/2000 | Barnes | F24C 15/168 | 126/339 |
| 7,159,510 | B2 * | 1/2007 | LaMaster | A23B 4/031 | 99/402 |
| 7,445,004 | B1 * | 11/2008 | Milner | A47J 33/00 | 126/30 |
| 8,602,019 | B2 * | 12/2013 | Baker | F24C 15/16 | 126/339 |
| 8,881,645 | B2 * | 11/2014 | Balcerzak | A47J 37/0688 | 99/421 H |
| 10,718,569 | B2 * | 7/2020 | Tomita | D03D 1/00 | |
| 10,980,344 | B1 * | 4/2021 | Yang | A47B 96/1466 | |
| 11,925,293 | B2 * | 3/2024 | Liu | A47J 37/0731 | |
| 2007/0137501 | A1 * | 6/2007 | Manuel | F24C 15/16 | 99/450 |
| 2008/0044537 | A1 * | 2/2008 | Manuel | A23L 5/15 | 426/523 |
| 2008/0178747 | A1 * | 7/2008 | Baker | A47J 37/01 | 99/422 |
| 2012/0073557 | A1 * | 3/2012 | Knight | A47J 37/079 | 126/19 R |
| 2013/0025472 | A1 * | 1/2013 | Stanger | F24C 15/16 | 99/448 |
| 2013/0119053 | A1 * | 5/2013 | Linton | F24C 15/16 | 219/762 |
| 2013/0247898 | A1 * | 9/2013 | Balcerzak | A47J 37/0786 | 126/25 R |
| 2013/0277374 | A1 * | 10/2013 | Lewis | A47J 36/16 | 220/573.4 |
| 2017/0030588 | A1 * | 2/2017 | Unwin | A23L 5/15 | |
| 2019/0049120 | A1 * | 2/2019 | Lormehs | F24C 15/16 | |
| 2020/0253004 | A1 * | 8/2020 | Carcano | H05B 6/6408 | |
| 2024/0068672 | A1 * | 2/2024 | Park | A47J 37/041 | |
| 2024/0093879 | A1 * | 3/2024 | Emanule Ceron | F24C 15/16 | |

FOREIGN PATENT DOCUMENTS

| | | | | |
|---|---|---|---|---|
| GB | 2193626 | A * | 2/1988 | A21B 3/15 |
| WO | WO-2011120698 | A1 * | 10/2011 | F24C 15/16 |

* cited by examiner

GRILL RACK SYSTEM AND METHOD

CROSS-REFERENCE TO RELATED APPLICATION

This application claims the benefit of U.S. Provisional Patent Application No. 63/490,096, filed Mar. 14, 2023, under 35 U.S.C. 119, which is incorporated by reference herein.

BACKGROUND OF THE INVENTION

The present invention generally relates to grill racks for grilling and/or smoking food products.

SUMMARY OF THE INVENTION

Implementations of the present disclosure relate to a grill rack system having one (or more) grill racks and grill brackets.

An aspect of the present disclosure involves a grill rack system comprising at least one grill rack; and a left-hand grill bracket and a right-hand grill bracket each including only one set bolt.

One or more implementations of the aspect of the present disclosure described immediately above includes one or more of the following: the at least one grill rack comprises a frame with cut corners and cut openings for grate installation; an embedded expanded steel grating surrounded by the frame; and a frame with a raised edge on one side of the rack that increases the depth between the top of the frame and the grating; the grill rack system includes a front adjacent to where a grill opens and a user accesses a grill and a rear, each of the right-hand grill bracket and the left-hand grill bracket includes at least one rack track guide, each defining a rack track guide opening, the at least one rack track guide defines a channel including a closed front end-point of the channel located closer to the front of the grill rack system than the rear of the grill rack system, and an open rear located closer to the rear of the grill rack system than the front of the grill rack system, the rack track guide opening accessing the open rear of the channel, the grill rack configured to slide over and into the rack track guide opening and movable in a forward direction until the grill rack reaches the end-point of the channel, allowing a substantial portion of the grill rack and food product thereon to be accessible by a user in front of a grill without substantial risk of touching an adjacent grill rack and/or being burned; the at least one rack track guide includes an upper track support and a lower track support parallel with the upper track support, the upper track support terminating at the rack track guide opening in upwardly angled flange, the grill rack configured to slide rearward up and over the upwardly angled flange and into the rack track guide opening; each of the right-hand grill bracket and the left-hand grill bracket comprises a bracket frame including a plurality of braces and a plurality of shelves, each transverse to each of the braces and each having a rack track guide; at least one fine-tuning adjustment screw attached to the grill bracket that can be expanded or retracted; and a bottom one of the shelves having raised legs; the set bolt attaches to the top-most point of only one of the braces that can be loosened or tightened; each of the right-hand grill bracket and the left-hand grill bracket comprises a rotisserie bracket attached to one of the shelves having a central recess to receive and rest an end of a skewer; and/or each of the right-hand grill bracket and the left-hand grill bracket comprises a smoke bar hanging bracket attached to an open frame where each bracket is arrow-shaped with recesses incrementally positioned along the bracket to receive and rest the end of the skewer.

An additional aspect of the present disclosure involves a grill rack system comprising at least one grill rack; and a left-hand grill bracket and a right-hand grill bracket each including at least one rack track guide each defining a rack track guide opening.

One or more implementations of the aspect of the present disclosure described immediately above includes one or more of the following: the at least one grill rack comprises a frame including cut corners and cut openings; an embedded expanded steel grating surrounded by the frame and including edges disposed in the openings; and the frame having a raised edge on one side of the rack that increases the depth between the top of the frame and the grating allowing for a recessed grilling surface when the grill rack is reversed; the grill rack system includes a front adjacent to where a grill opens and a user accesses a grill and a rear, the at least one rack track guide defines a channel including a closed front end-point of the channel located closer to the front of the grill rack system than the rear of the grill rack system, and an open rear located closer to the rear of the grill rack system than the front of the grill rack system, the rack track guide opening accessing the open rear of the channel, the grill rack configured to slide over and into the rack track guide opening and movable in a forward direction until the grill rack reaches the end-point of the channel, allowing a substantial portion of the grill rack and food product thereon to be accessible by a user in front of a grill without substantial risk of touching an adjacent grill rack and/or being burned; the at least one rack track guide includes an upper track support and a lower track support parallel with the upper track support, the upper track support terminating at the rack track guide opening in upwardly angled flange, the grill rack configured to slide rearward up and over the upwardly angled flange and into the rack track guide opening; each of the right-hand grill bracket and the left-hand grill bracket comprises a bracket frame including a plurality of braces and a plurality of shelves, each transverse to each of the braces and each including the rack track guide; a set bolt attached to the top-most point of only one of the braces that can be loosened or tightened; a set of fine-tuning adjustment screws attached to the plurality of braces that can be expanded or retracted; and a bottom one of the shelves having raised legs; each of the right-hand grill bracket and the left-hand grill brackets comprises a rotisserie bracket attached to one of the shelves including a central recess to receive and rest an end of a skewer; and a smoke bar hanging bracket attached to an open frame where each bracket is arrow-shaped with recesses incrementally positioned along the bracket to receive and rest the end of the skewer.

A further aspect of the present disclosure involves a grill rack system comprising at least one grill rack with opposite sides and having at least one rear crossmember alignment tab extending from at least one of the opposite sides; a left-hand grill bracket and a right-hand grill bracket each including at least one rack track guide each defining a rack track guide opening and each including the at least one alignment tab disposed in the at least one rack track guide.

One or more implementations of the aspect of the present disclosure described immediately above includes one or more of the following: the at least one grill rack comprises a frame with cut corners and cut openings for grate installation; an embedded expanded steel grating surrounded by the frame; and a frame with a raised edge on one side of the rack that increases the depth between the top of the frame and the grating; the grill rack system includes a front adjacent to where a grill opens and a user accesses a grill and a rear, the at least one rack track guide defines a channel including a closed front end-point of the channel located closer to the front of the grill rack system than the rear of the grill rack system, and an open rear located closer to the rear of the grill rack system than the front of the grill rack system, the rack track guide opening accessing the open rear of the channel, the at least one rear crossmember alignment tab of the grill rack configured to slide over and into the rack track guide opening and movable in a forward direction until the grill rack reaches the end-point of the channel, allowing a substantial portion of the grill rack and food product thereon to be accessible by a user in front of a grill without substantial risk of touching an adjacent grill rack and/or being burned; the at least one rack track guide includes an upper track support and a lower track support parallel with the upper track support, the upper track support terminating at the rack track guide opening in upwardly angled flange, the at least one rear crossmember alignment tab of the grill rack configured to slide rearward up and over the upwardly angled flange and into the rack track guide opening; each of the right-hand grill bracket and the left-hand grill bracket comprises a bracket frame including a plurality of braces and a plurality of shelves, each transverse to each of the braces and each including the rack track guide; a set bolt attached to the top-most point of only one of the braces that can be loosened or tightened; at least one fine-tuning adjustment screw attached to the grill bracket that can be expanded or retracted; and a bottom one of the shelves having raised legs; one of the right-hand grill bracket and the left-hand grill bracket includes a rotisserie bracket attached to one of the shelves having a central recess to receive and rest an end of a skewer; and a smoke bar hanging bracket attached to an open frame where each bracket is arrow-shaped with recesses incrementally positioned along the bracket to receive and rest the end of the skewer; the at least one grill rack is an accessory rack with a food holder integrated with the grill rack and configured to be used with at least one of a closed-track grill rack shelf and an open-track grill rack shelf; and/or the accessory rack is one of a jalapeno holder accessory rack, a rib holder accessory rack, a beer can accessory rack, and a drumstick holder accessory rack.

BRIEF DESCRIPTION OF THE DRAWINGS

In order to describe the manner in which the present disclosure can be implemented, a more particular description will be rendered by reference to specific implementations thereof which are illustrated in the appended drawings. For better understanding, the like elements have been designated by like reference numbers throughout the various accompanying figures. Understanding that these drawings depict only typical implementations of the invention and are not therefore to be considered to be limiting of its scope, the invention will be described and explained with additional specificity and detail through the use of the accompanying drawings in which.

DETAILED DESCRIPTION

In this disclosure, as illustrated in FIGS. 1-8, specific terminology is employed for the sake of clarity. The invention as claimed in this application, however, is not intended to be limited to specific terminology so selected, and it is to be understood that each specific element includes all technical equivalents that operate in a similar manner to accomplish similar functions.

Figure 1A:
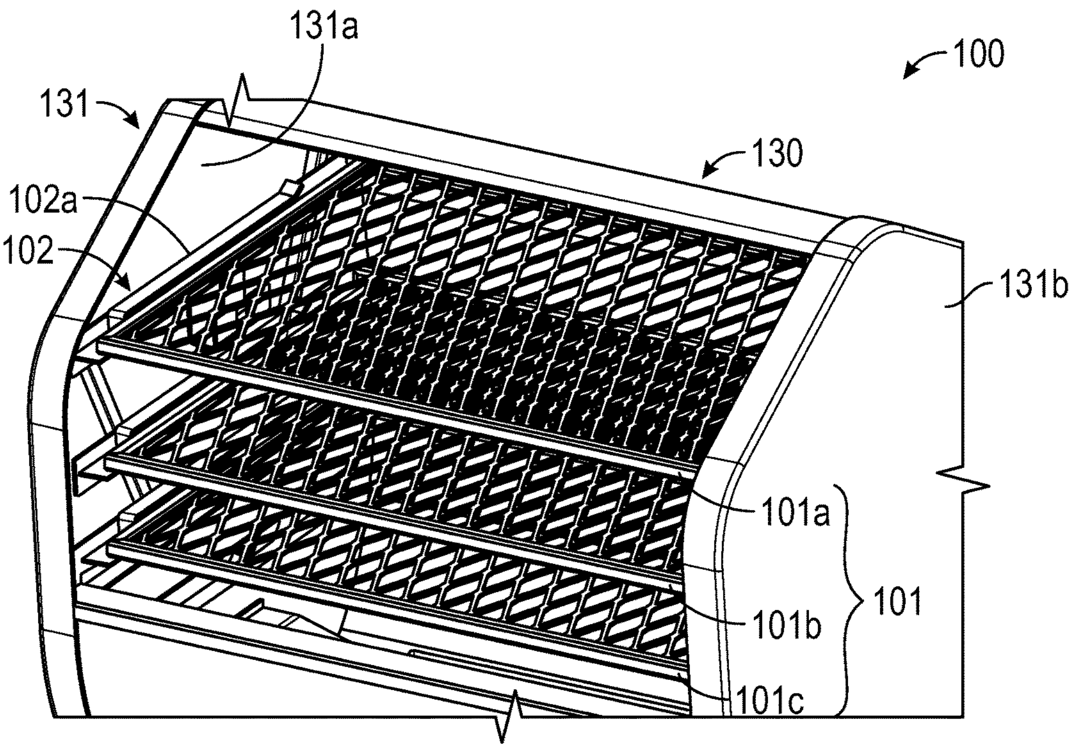
FIG. 1A illustrates a perspective view of a three-tiered grill rack system installed in a grill housing according to an implementation of the present disclosure.
Figure 1B:
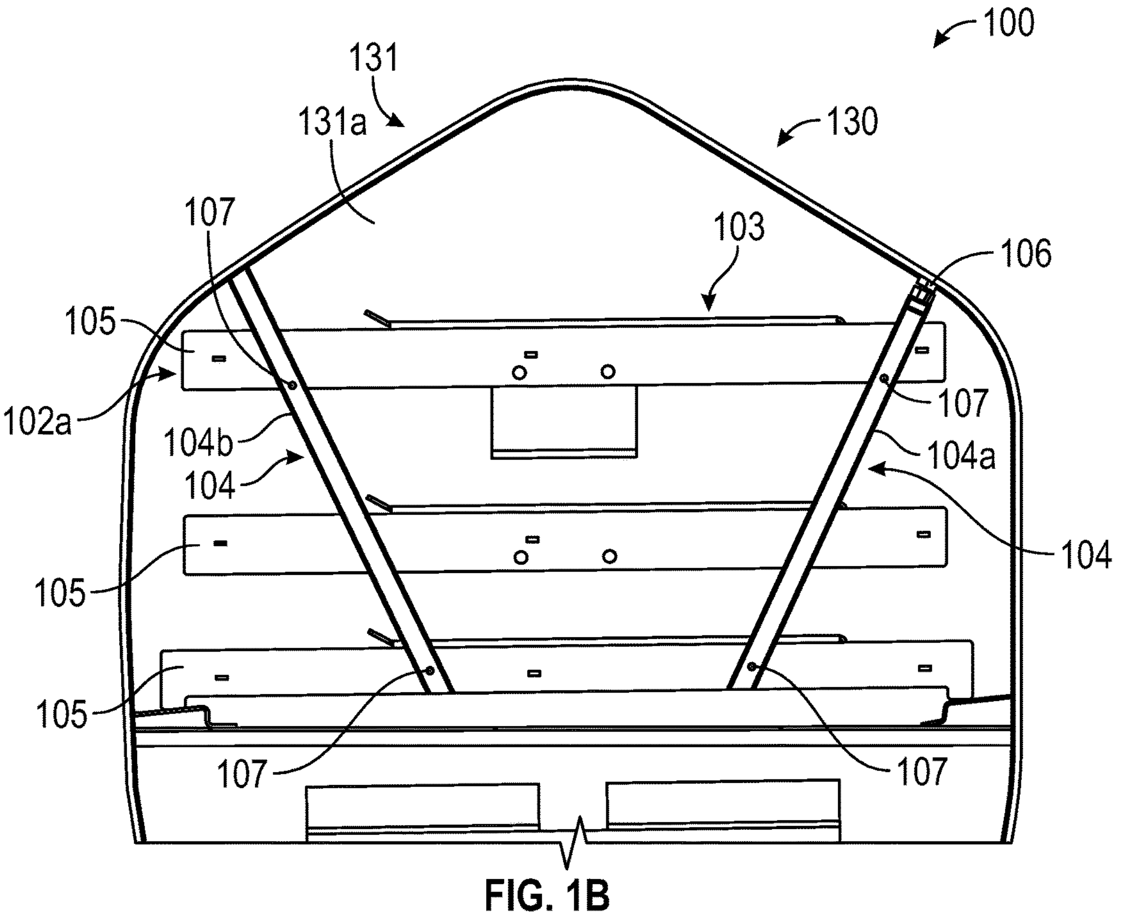
FIG. 1B illustrates a detailed sided view of the outward-facing side of the left-hand grill bracket of the grill rack system of FIG. 1A installed in a grill housing.

Reference will now be made to the figures to describe various aspects of example embodiments of the disclosure. FIG. 1A depicts a grill rack system 100 comprising one or more grill racks 101 and grill brackets 102. Grill rack system 100 can also comprise a multi-tiered grill rack system having a plurality of grill racks 101 (101*a*, 101*b*, and 101*c*) and grill brackets 102 (102*a*, 102*b* (See FIG. 2)). As shown in FIG. 1B, grill bracket 102*a* can include a plurality of grill rack mounting elements to be connected to the inner surface of the grill housing walls 131 (131*a*, 131*b*).

As depicted in FIG. 1B, a grill bracket frame 103, including a plurality of braces 104 (104*a*, 104*b*) and a plurality of shelves 105, are connected to the inner surface of the grill housing walls 131. The grill brackets 102 further comprise only one set bolt 106 and a set of fine-tuning adjustment screws 107. In one or more embodiments, the set bolt 106 is attached to the top-most point of front brace 104*a* and can be loosened or tightened to fit the inner surface of the grill housing walls 131. A single adjustment bolt 106 provides for quick installation. The set of finetuning adjustment screws 107 may be attached to the braces 104 and are expanded or retracted to accommodate grill housing walls 131 that taper inward. For example, fine-tuning adjustment screws 107 can be adjusted so grill bracket frame 103 is vertical even if the wall of the grill housing 131 isn't. It will be appreciated that the grill bracket frame 103 can comprise a channel, rail, track, or other suitable grill rack shelving.

As shown in FIGS. 1A and 1B, the grill housing 130 may be pentagonal prism-shaped having a pentagon cross-section shape from a side view. Grill housings 130 of this shape have a triangular top portion or edge that is substantially recessed relative to the elongated (central) straight and/or linear portion or edge. Accordingly, lower grill rack 101*c* can extend from the rear of the grill housing 130 to the front thereof at the same point as the other grill racks 101. Each grill rack 101 has the same depth (front-to-back) because the location of each of the grill racks 101 corresponds to the elongated (central) straight and/or linear portion or edge of the grill housing 130.

Figure 2:
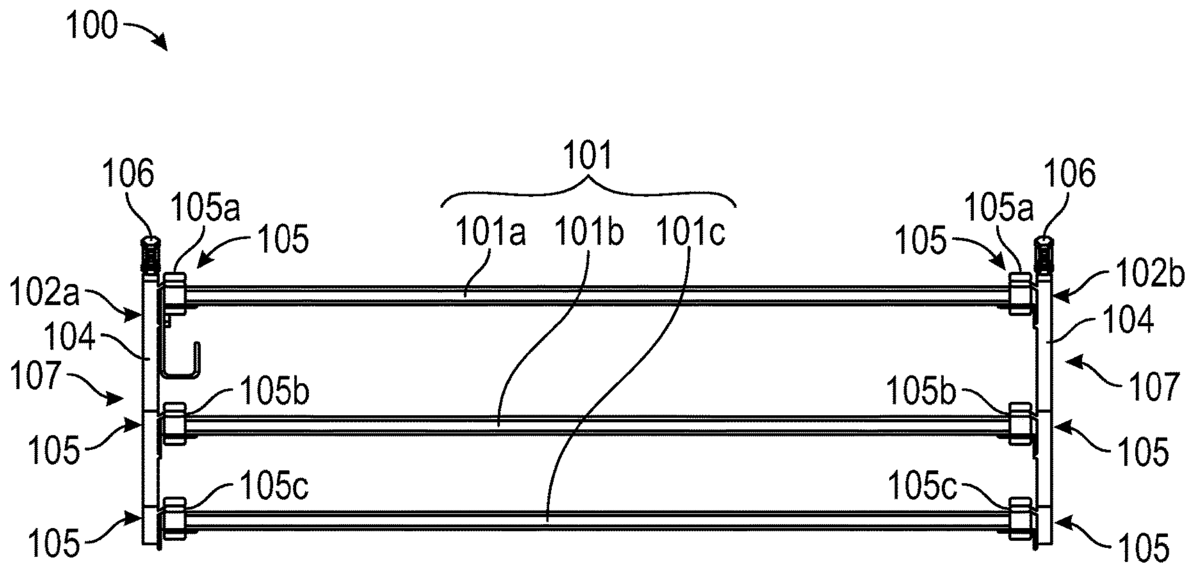
FIG. 2 illustrates a perspective view of the grill rack system of FIG. 1A not installed in a grill housing and with installed grill racks.

As illustrated in FIG. 2, an upper grill rack 101*a* can be disposed in an upper, first-tier, and an intermediate grill rack 101*b* can be disposed in an intermediate, second-tier, and a lower grill rack 101*c* can be disposed in a lower, third-tier. The grill racks 101 are arranged in a vertically spaced relationship within the multi-tiered grill rack system 100. Upper grill rack 101*a* is placed vertically over middle grill rack 101*b*, and both of which are placed vertically over lower grill rack 101*c*. The grill racks 101 are placed in the grill housing 130. One or more grill racks 101 (e.g., upper grill rack 101*a* and intermediate grill rack 101*b*) can be supported and/or suspended by a left-hand grill bracket 102*a* and a right-hand grill bracket 102*b*. The left-hand grill bracket 102*a* and right-hand grill bracket 102*b* may be mirror images of each other. As shown in FIG. 2, left-hand grill bracket 102*a* and right-hand grill bracket 102*b* each have at least one grill rack shelf 105 to store the grill rack 101. Grill rack shelves 105 (105*a*, 105*b*, and 105*c*) on left-hand grill bracket 102*a* and grill rack shelves 105 on the right-hand grill bracket 102*b* correspond to each other and create a set of parallel shelves that the grill racks 101 are placed on. In some embodiments, grill rack system 100 may include multiple grill rack shelves 105, some or all of which may be used to support the grill racks 101. Indeed, more grill rack shelves 105 may be provided than there are grill racks 101, in a given grill rack system 100.

For example, in a three-tiered grill rack system 100, one, two, or three or more sets of grill racks 101 may be provided. These additional grill racks 101 and grill rack shelves 105 may provide a greater amount of flexibility to the user when placing grill racks 101. Still further, at least in some cases, the grill rack brackets 102 are adjustable to the grill housing 130 shape and structure. In this manner, the grill rack system 100 may be fully customizable to the user.

Figure 3:
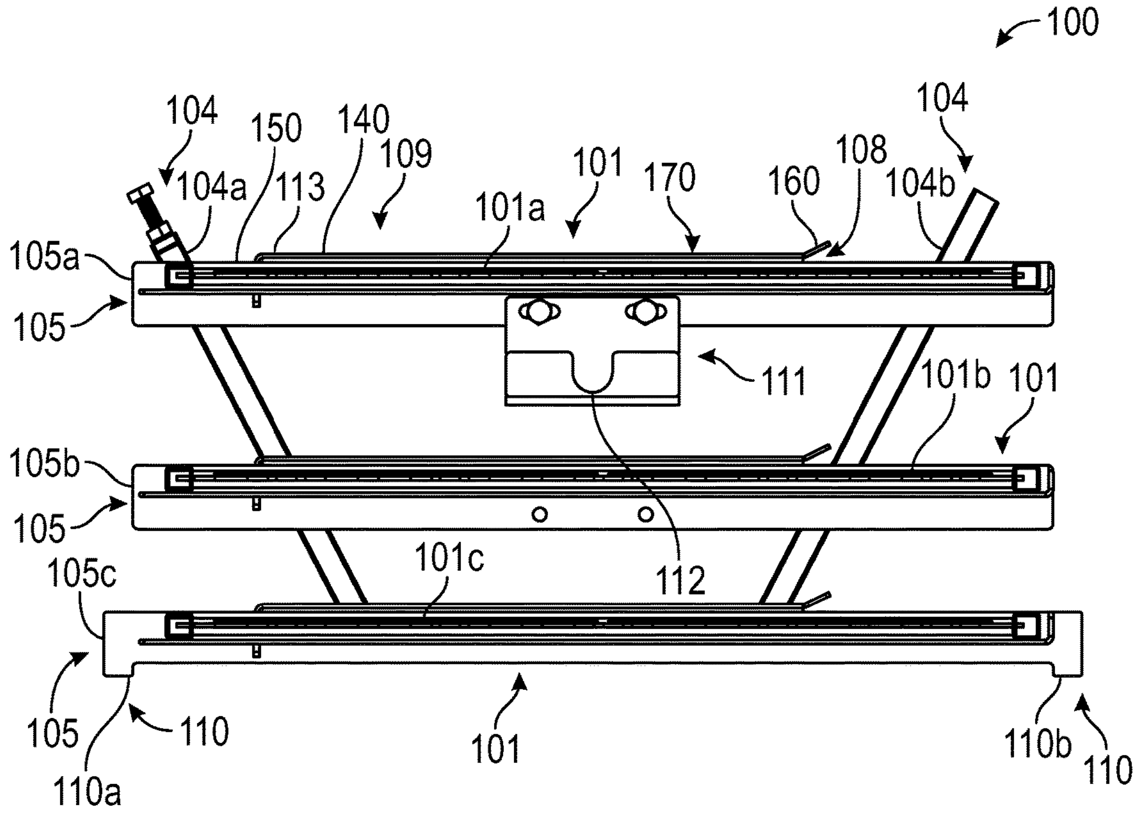
FIG. 3 illustrates a detailed sided view of the inward-facing side of the left-hand grill bracket of the grill rack system of FIG. 2.

As shown in FIG. 3, third-tier grill rack shelf 105*c* has raised legs 110 (110*a*, 110*b*) allowing for grill rack 101*c* to rest above the bottom of the grill to accommodate for a stock grate. A rotisserie bracket 111 is attached to the bottom portion of one of the grill rack shelves 105 having a central recess 112 to receive and rest the end of a skewer.

Figure 4A:
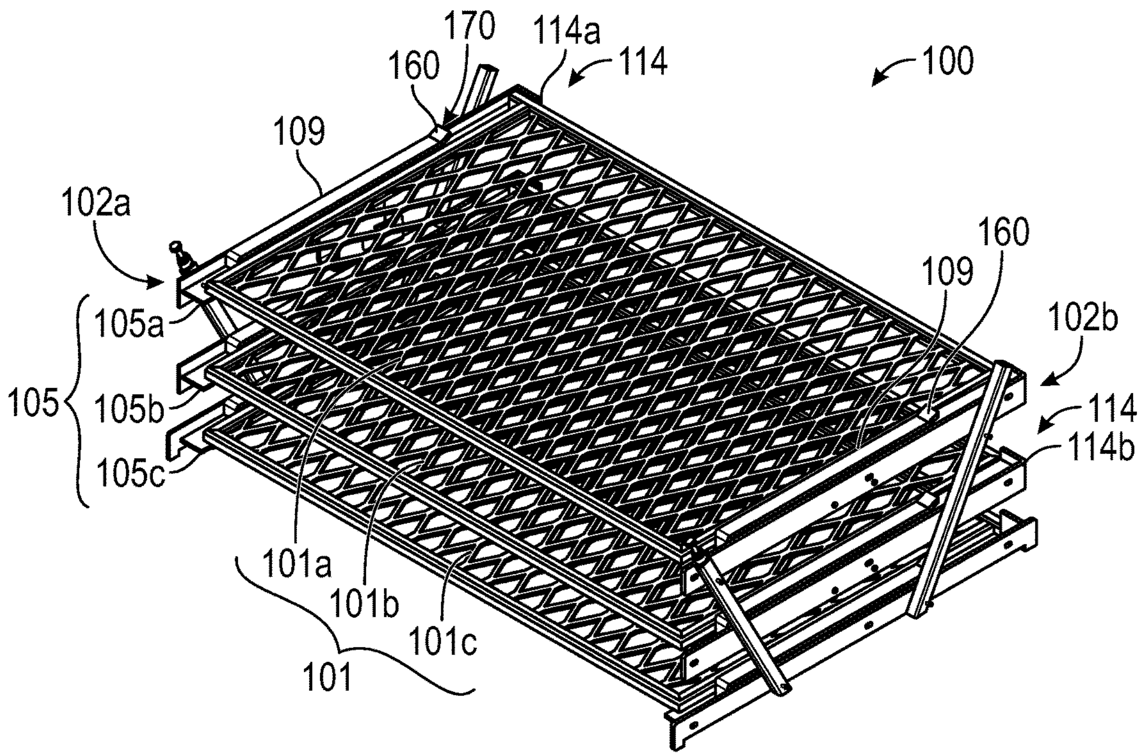
FIG. 4A illustrates a perspective elevation view of the grill rack system of FIG. 2.
Figure 4B:
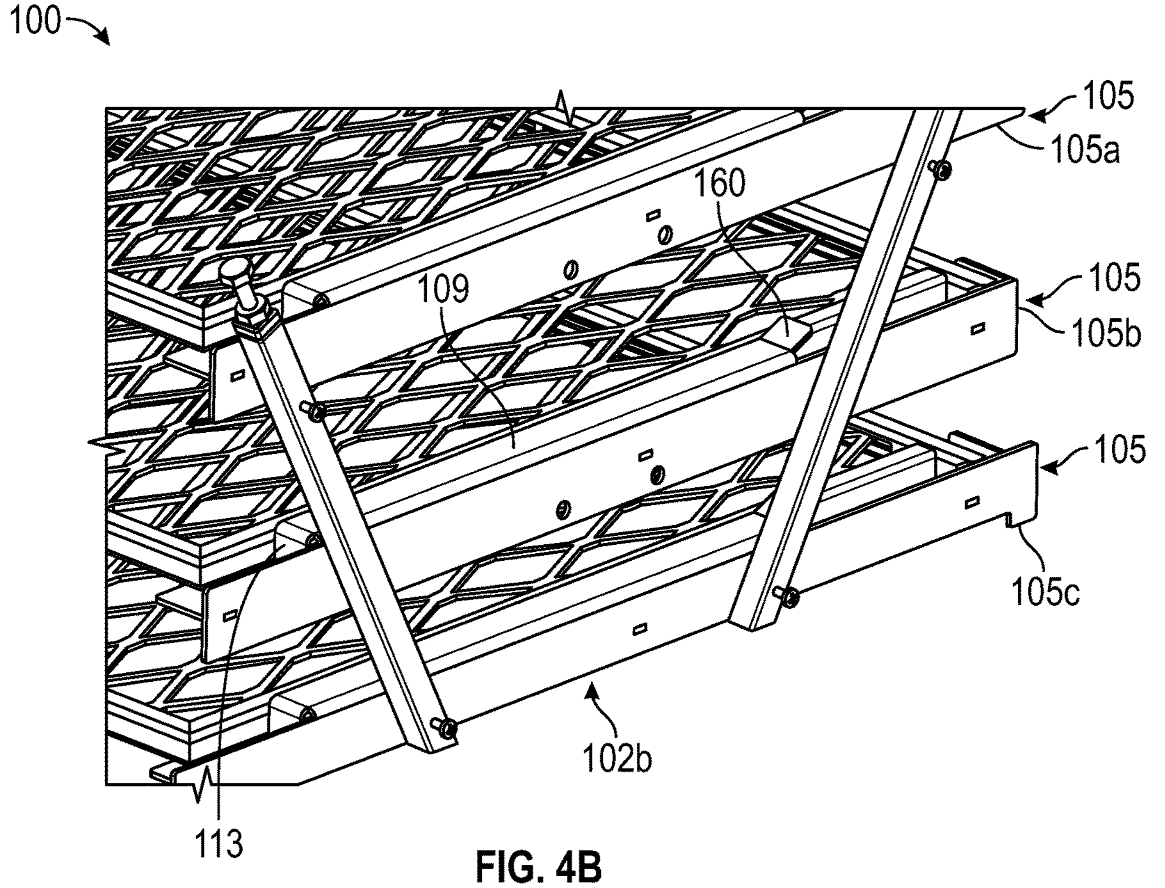
FIG. 4B illustrates a detailed perspective elevation view of the right-hand grill bracket of the grill rack system of FIG. 4A.
Figure 5A:
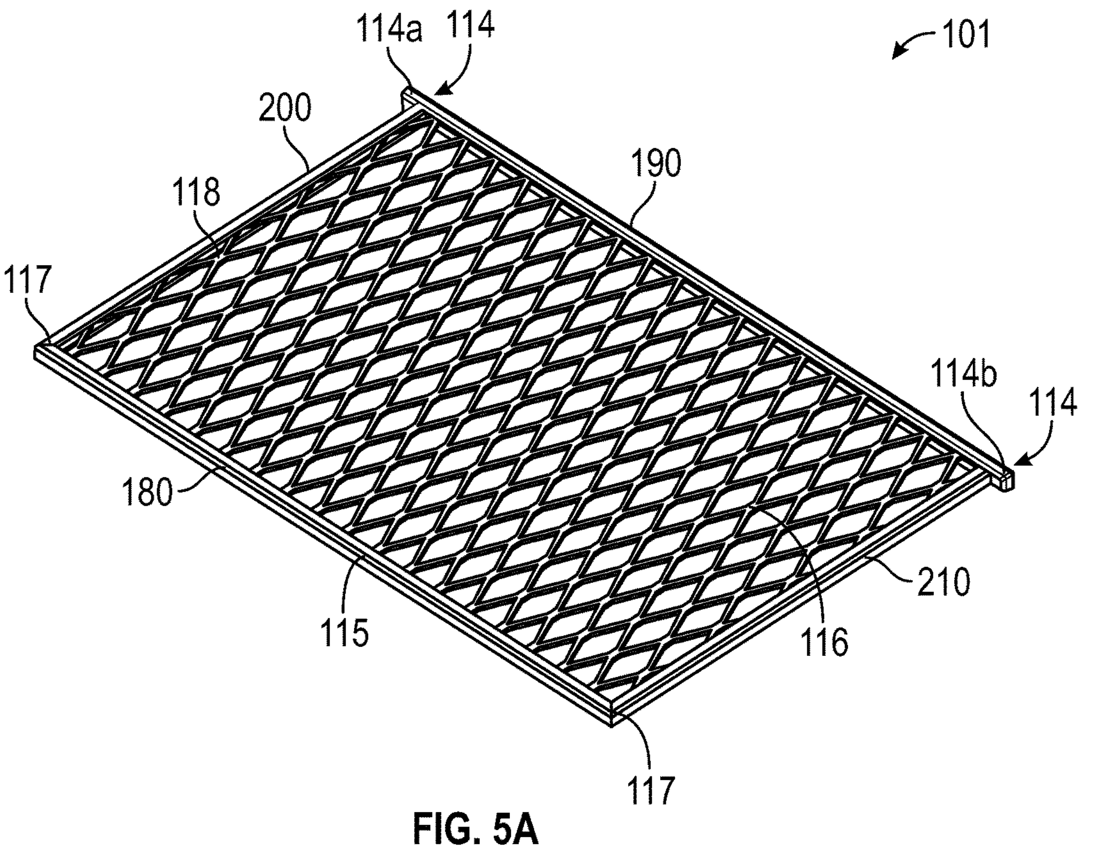
FIG. 5A illustrates a perspective elevation view of the grill rack of the grill rack system of FIG. 2.
Figure 5B:
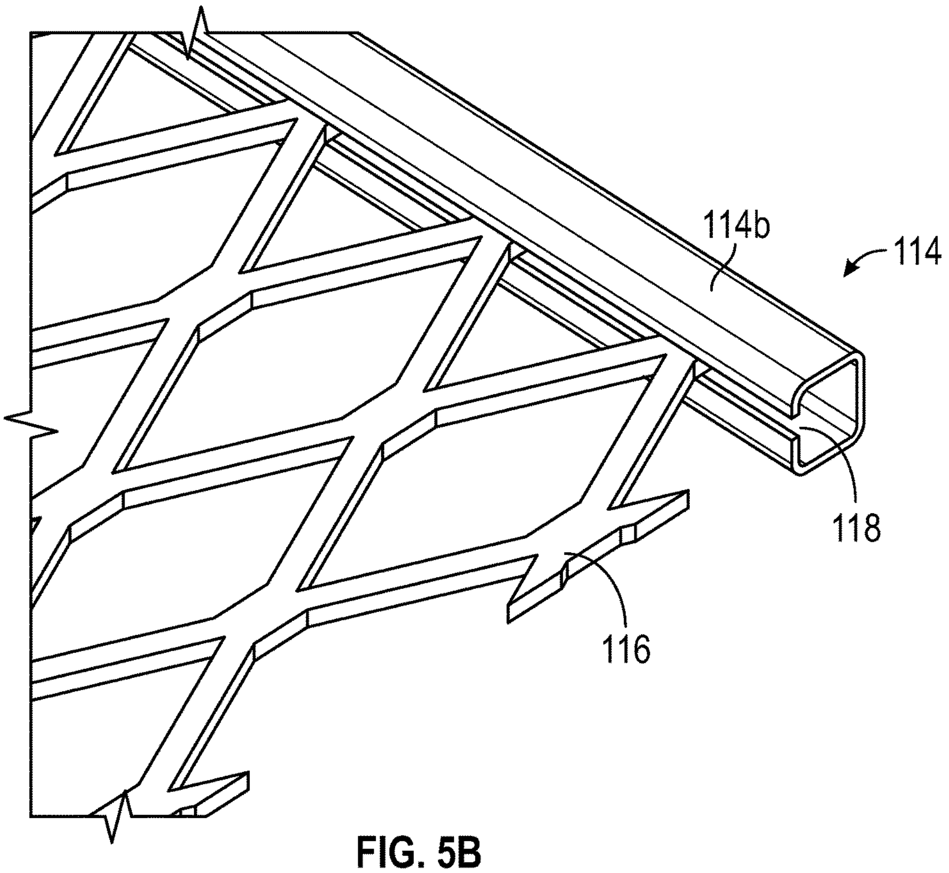
FIG. 5B illustrates a detailed perspective elevation view of the grill rack of the grill rack system of FIG. 1A.
Figure 10:
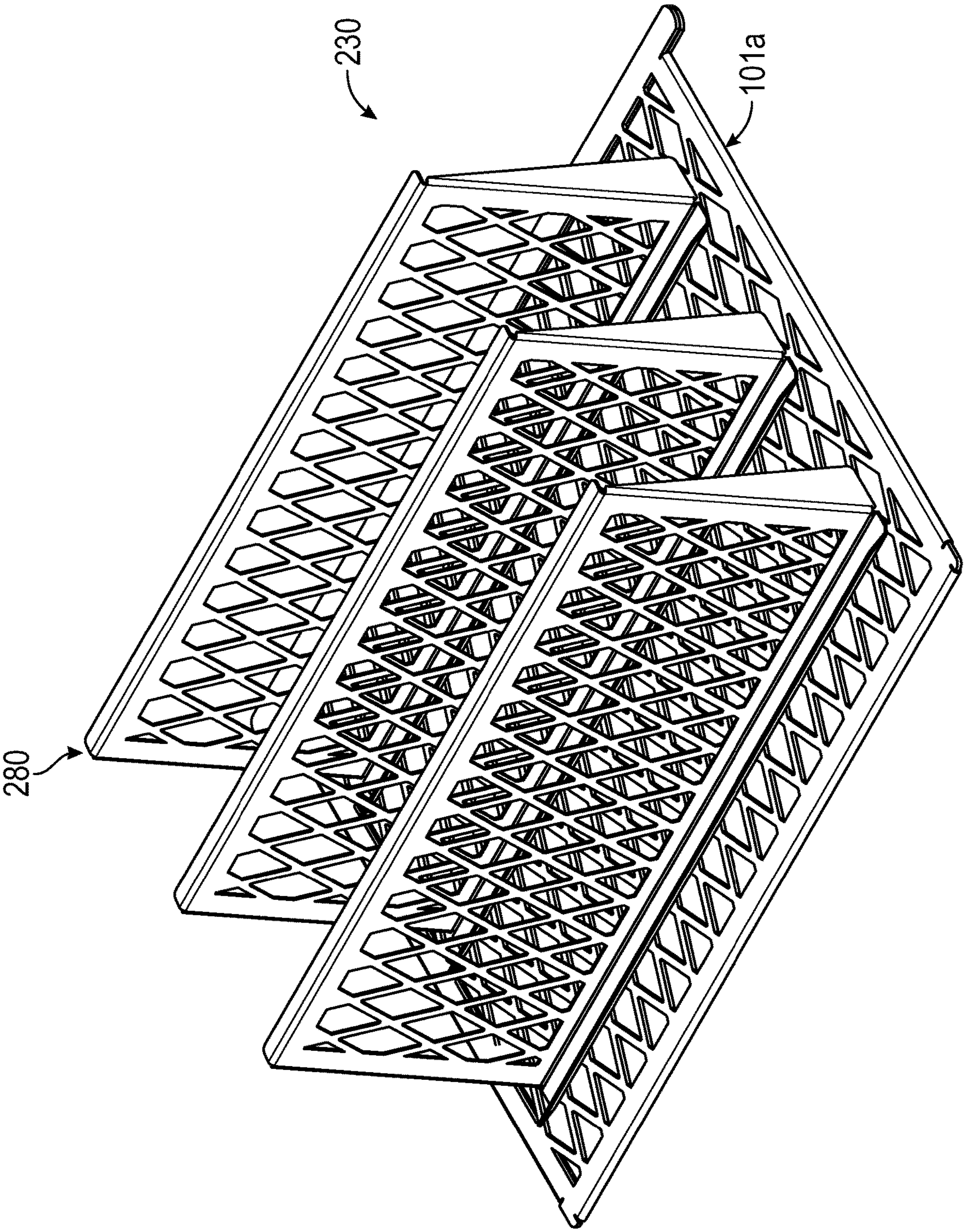
FIG. 10 is a perspective view of an embodiment of a rib holder rack.
Figure 11:
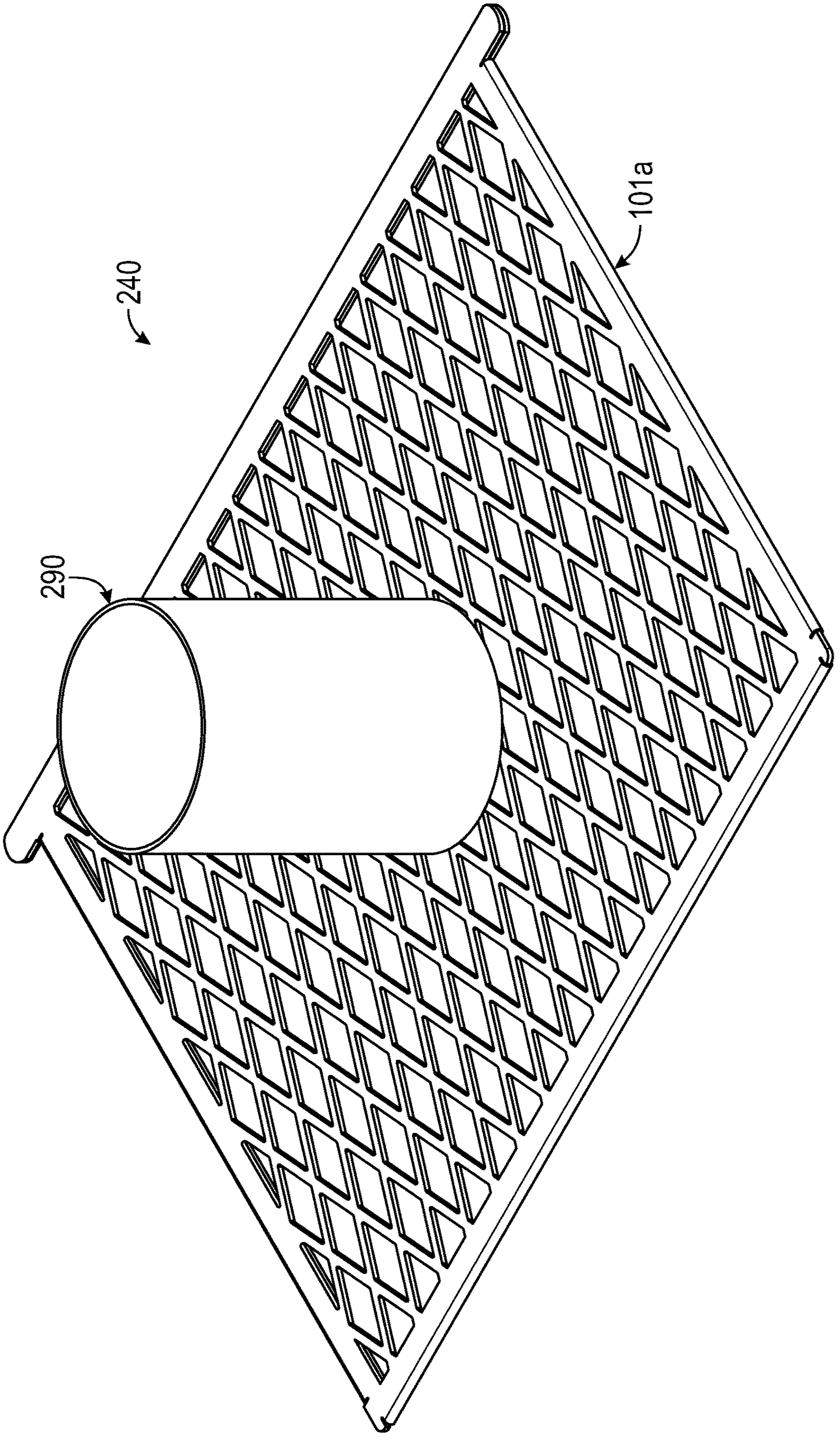
FIG. 11 is a perspective view of an embodiment of a beer can rack.
Figure 12:
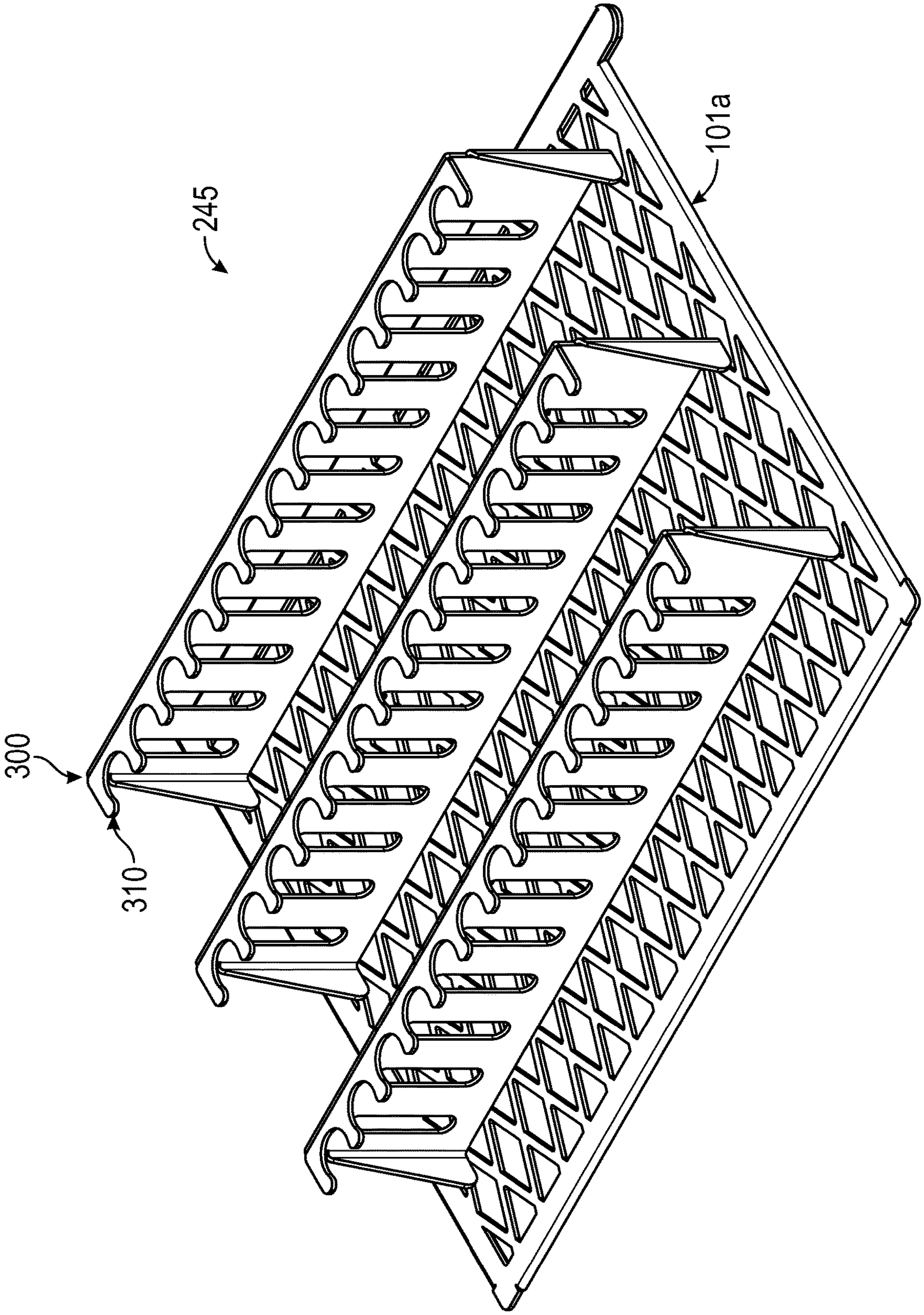
FIG. 12 is a perspective view of an embodiment of a drumstick holder rack.

As shown in FIGS. 3, 4A and 4B, the grill rack shelf 105, which may include one or shelves (e.g., upper shelves 105*a*, middle shelves 105*b*, lower shelves 105*c*) is transverse to each of the braces 104. Each grill rack shelf 105 includes a rack track guide(s) 109 with parallel upper track support 140 and lower track support 150. The upper track support 140 terminates closer to a front of the grill rack system 100 in stop 113 forming a closed track system and terminates closer to a rear of the grill rack system 100 in upwardly angled flange 160. A channel 170 is formed between the upper track support 140 and lower track support 150. The channel 170 is closed at the stop 113 and includes a rack track guide opening 108 between the flange 160 and the lower track support 150. One or more grill racks 101 (e.g., upper grill racks 101*a*, middle grill rack 101*b*, lower grill rack 101*c*) can be supported and/or suspended by the rack track guide(s) 109 of the grill rack shelf 105. As shown in FIGS. 5A and 5B, the grill rack 101 includes a grill rack frame 115 including front, rear frame crossmembers 180, 190, and left, right frame side members 200, 210. The rear frame crossmember 190 terminates at opposite ends in rear crossmember alignment tabs or extensions 114 (e.g., left extension 114*a*, right extension 114*b*) that provide a tubular extension beyond the left and the right side frame side members 200, 210 of the grill rack frame 115. The extensions 114*a*, 114*b* preferably include a radius or are curved as shown in FIGS. 10-12.

As further depicted in FIG. 5A, an embedded expanded steel grating 116 is surrounded by the grill rack frame 115, which includes laser cut corners 117 and laser cut openings 118. The embedded expanded steel grating 116 takes a diamond pattern to create sear marks on the grilled food product and is made from carbon steel. As shown in FIG. 5B, the rear crossmember alignment tabs or extensions 114, along with the surrounding the grill rack frame 115, are hollow with laser cut openings 118 in the grill rack frame 115 to fit and secure the embedded expanded steel grating 116. Embedding the expanding steel grating 116 within the frame's laser cut openings 118 hides the expanded steel edges. The grill rack frame 115 can have a raised edge on one side of the grill rack 101 that increases the depth between the top of the grill rack frame 115 and the embedded expanded steel grating 116 allowing for a recessed grilling surface when the grill rack 101 is reversed. Such a configuration may prevent and/or inhibit food products from sliding off the grill rack 101 and provides an optional recessed grilling surface.

To install the grill rack 101 onto and into the closed-track grill rack shelf 105, the extensions 114 are slid rearwardly, from a front of the grill rack system 100 towards the rear of the grill rack system 100, over/along the upper track supports 140 while the left and the right side frame side members 200, 210 slide along an inner portion of the lower track supports 150. The extensions 114 slide up and over the upwardly angled flanges 160, which provides the larger and more accessible rack track guide openings 108 for entry of the extensions 114 of the grill rack 101, and onto the lower track supports 150. The grill rack 101 is then pulled forwardly, with the extensions 114 moving forwardly past the flanges 160/openings 108, from the rear of the grill rack system 100 towards the front of the grill rack system 100, with the extensions 114 and the left and the right side frame side members 200, 210 sliding along the lower track supports 150. The extensions 114 are captured into the channel 170 (see FIG. 4A) and, serving as an extension of the frame 115, allow the grill rack 101 to slide smoothly forward and backward in the closed-track rack track guide 109. The grill rack 101 may slide forwardly in the channel 170, along the lower track support 150, until the extension 114 of the grill rack 101 reaches the end of the closed-track channel 170 at stop 113. In this forward-most position, the closed-track rack track guide 109 allows the grill rack 101 to be extended outward/forward and virtually fully beyond the housing of the grill 130 at the same height and position that the grill rack 101 maintained inside the grill housing 130 and on the lower track support 150. The stops 113 function as rack track guide closed end-points, closing the channel(s) 170, allowing substantially all of the grill rack 101 to extend outward/forward without descending. The closed-track rack track guide 109 and the channel 170 provide a closed-track pathway for the grill rack(s) 101 to fully extend forward/outward and away from the smoke/heat, without allowing the grill rack(s) 101 to be completely removed forwardly/outwardly from the channel(s) 170 so that food products can be easily accessed without reaching into the back of the grill housing 130. Such configurations allow users, when the grill rack 101 is extended forward/outward and away from the grill housing 130, to flip and/or rotate food products without the substantial risk of touching an adjacent grill rack and/or being burned thereby.

Figure 6A:
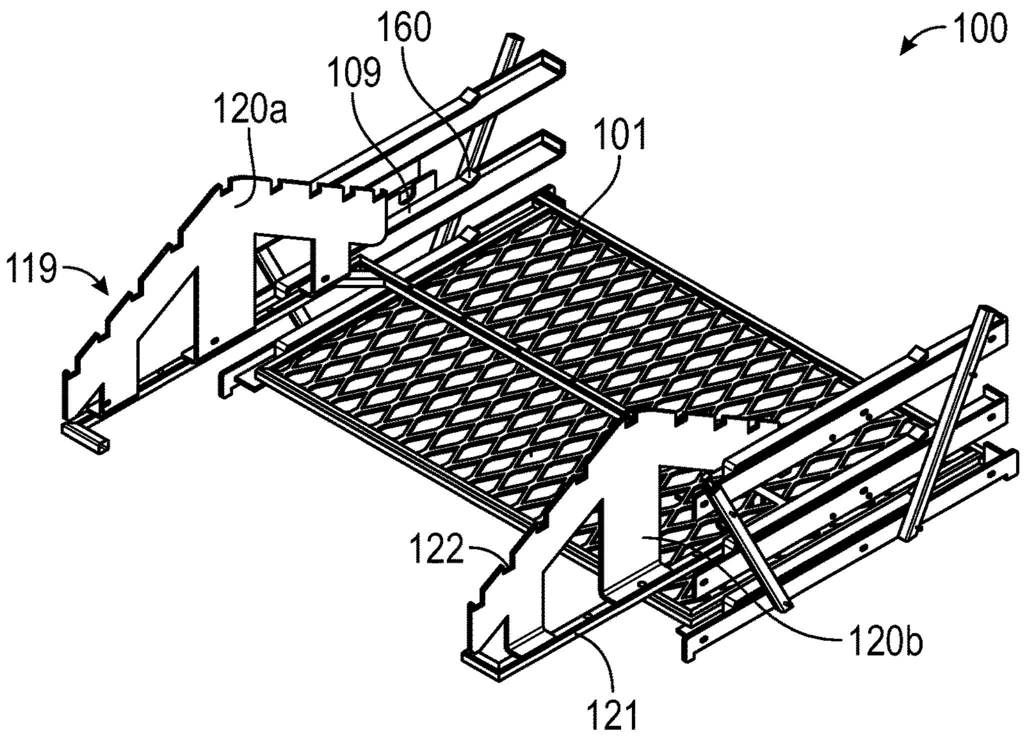
FIG. 6A illustrates a perspective elevation view of the smoke bar hanging bracket and the grill rack system of FIG. 2 shown assembled for use in the grill rack system.
Figure 6B:
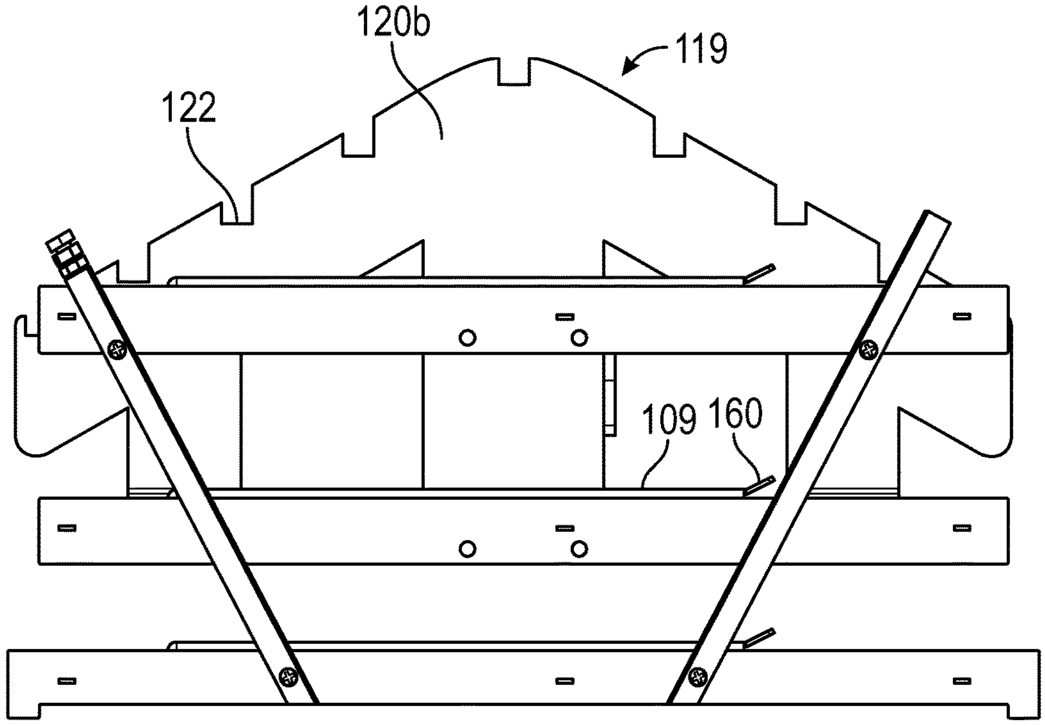
FIG. 6B illustrates a detailed sided view of the outward-facing side of the right-hand smoke bar hanging bracket of the smoke bar hanging bracket of FIG. 6A.

In some embodiments as shown in FIGS. 6A and 6B, the grill rack system 100 includes a smoke bar hanging bracket attachment 119, which includes a left-hand side bracket panel 120*a* and a right-hand side bracket panel 120*b* that is attached to the smoke bar hanging bracket frame 121, which is an open frame. Bracket panels 120*a*, 120*b* are arrow-shaped with recesses 122 incrementally positioned along the bracket to receive and rest the ends of skewers. The open frame 121 structure of the smoke bar hanging bracket 119 allows for the attachment to be treated like a grill rack that can slide smoothly over the rack track guide 109 and into the rack track guide opening 108, which provides seamless integration of the attachment with the entire grill rack system 100. The open frame 121 structure of the smoke bar hanging bracket 119 provides the user with an unobstructed area to place a grill rack 101 below the smoke bar hanging bracket 119 and grill underneath the smoke bar hanging bracket 119. All of the following components described above are preferably made of carbon steel. In some embodiments, the components may alternatively be made of stainless steel or aluminum.

Figure 7A:
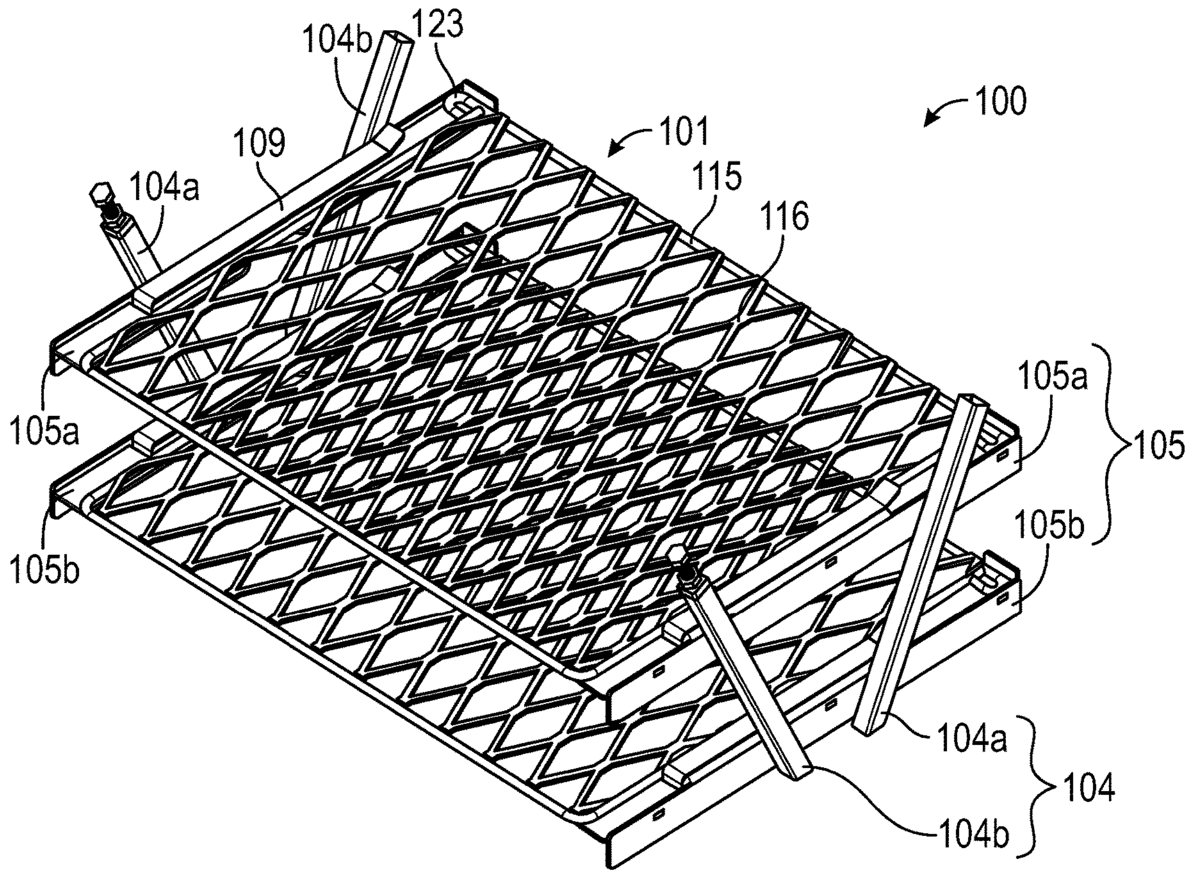
FIG. 7A illustrates a perspective elevation view of a two-tiered grill rack system with grill racks installed according to an implementation of the present disclosure.
Figure 7B:
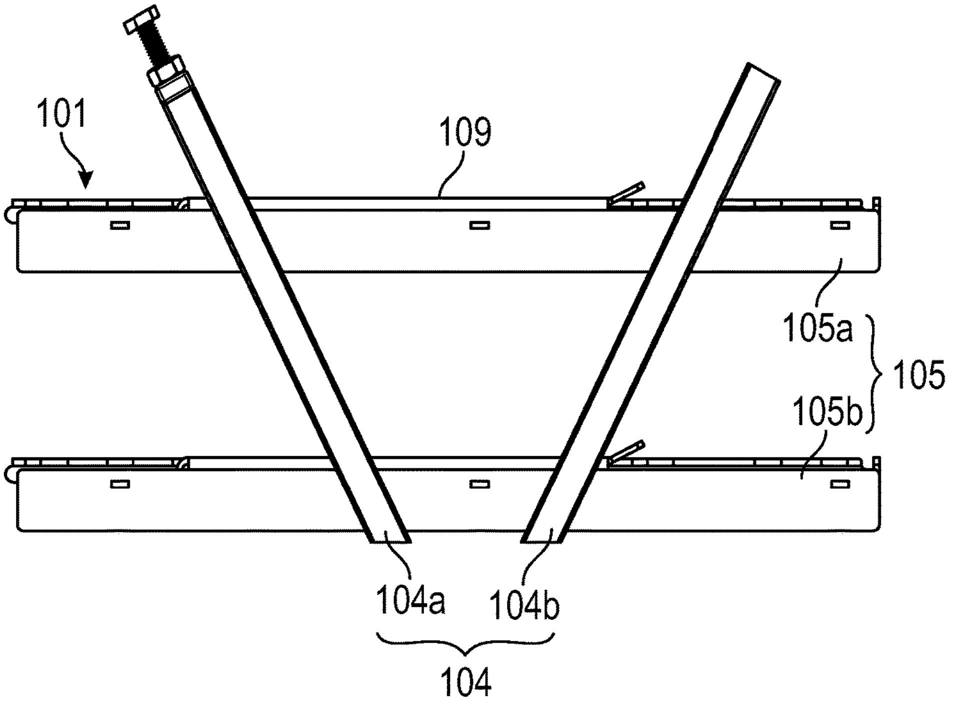
FIG. 7B illustrates a detailed sided view of the outward-facing side of the right-hand grill bracket of the grill rack system of FIG. 7A.
Figure 7C:
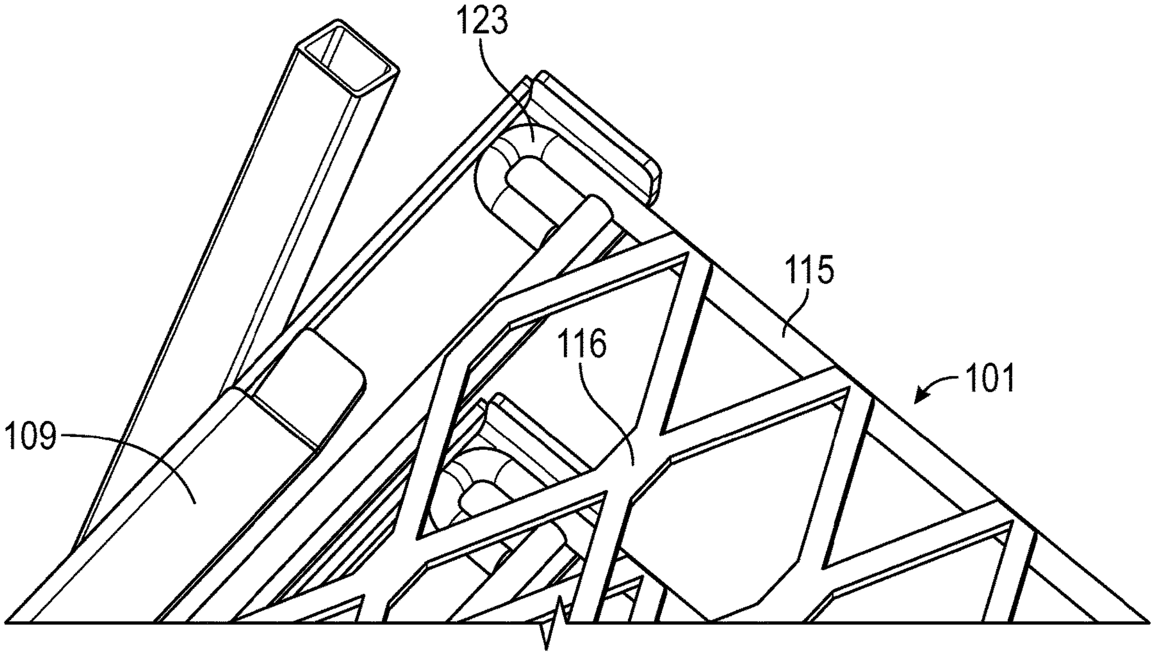
FIG. 7C illustrates a detailed perspective elevation view of the grill rack of the grill rack system of FIG. 7A.
Figure 8A:
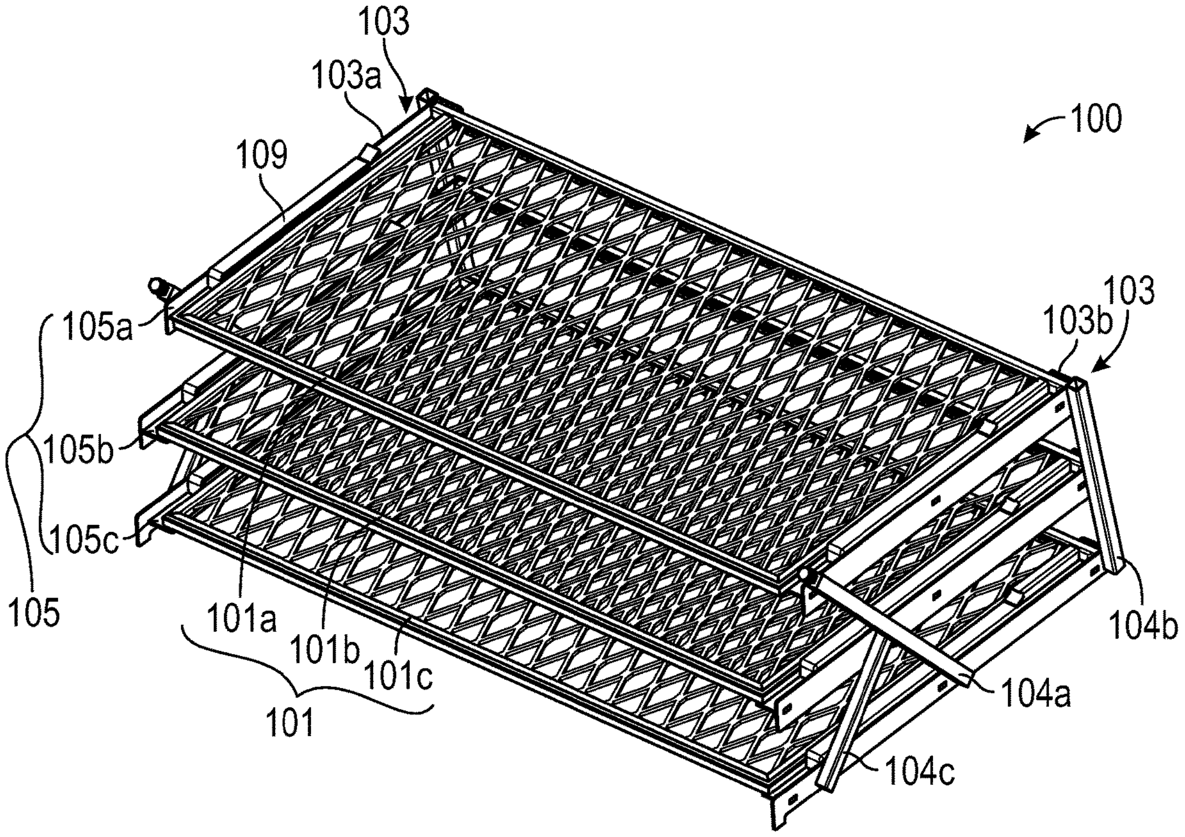
FIG. 8A illustrates a perspective elevation view of a three-tiered grill rack system with grill racks installed according to an implementation of the present disclosure.
Figure 8B:
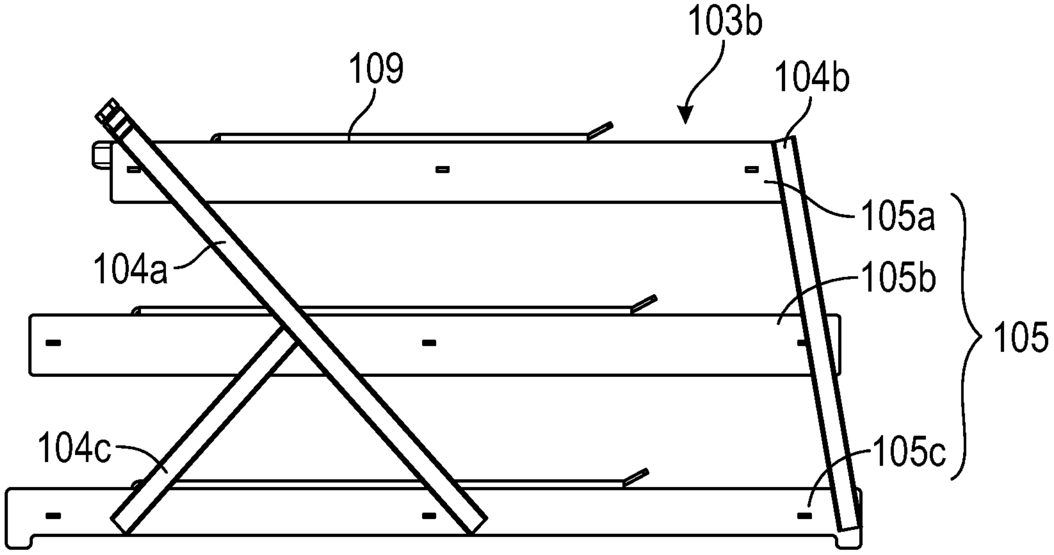
FIG. 8B illustrates a detailed sided view of the outward-facing side of the right-hand grill bracket of the grill rack system of FIG. 8A.

Referring to FIGS. 7A and 7B, one or more embodiments may include two rack shelves 105, which can be disposed on a first-tier shelf 105*a* and a second-tier shelf 105*b*. Indeed, one or both grill rack shelves 105 may be used to support the grill racks 101. The grill rack shelves 105 are transverse to each of the braces 104 (104*a*, 104*b*) and may include the same grill rack mounting elements as a grill rack system 100 with three grill rack shelves 105. In some embodiments, the grill rack frame 115 is made from a wire rod, which is shown in FIGS. 7A and 7C. Unlike the tubular grill rack frame 115 shown in FIG. 5A, which has laser cut openings 118 for grate installation, the expanded steel grating 116 in FIG. 7A is attached, for example, welded, on top of the wire rod frame 115. FIG. 7C further illustrates how, unlike the rear crossmember alignment tabs 114 in FIGS. 5A and 5B, the wire rod grill rack frame 115 has a U-shaped tab 123 that extends beyond the left and right-hand sides of the grill rack frame 115. The U-shaped tab 123 serves the same purpose as the rear crossmember alignment tabs 114 by serving as an extension of the frame and allowing the grill rack 101 to slide smoothly forward and backward in the rack track guide 109. A further embodiment is provided in FIGS. 8A and 8B having a grill bracket frame 103 containing three braces 104*a*, 104*b*, and 104*c*. Back brace 104*b* is slanted forward so that the grill rack shelves 105 can support the incrementally increasing depth of the grill racks 101. Front brace 104*a* is angled outward and is similar to the braces 104 in FIG. 4A, but includes shorter brace 104*c* that intersects front brace 104*a* in a T-shape structure that provides additional structural support to the grill rack system 100 and second-tier shelf 105*b* and third-tier shelf 105*c*.

The grill racks 101 increase in depth to maximize the available cooking surface area on the grill racks 101 for grill housings 130 that are barrel-shaped having a round, circular cross-section shape from a side view. Grill housings 130 of this shape have a rounded and/or curved top portion or edge that is substantially recessed relative to the elongated (central) straight and/or linear portion or edge.

Accordingly, while third-tier grill rack 101*c* can extend from the rear of the grill housing 130 to the front thereof at a deeper point corresponding to elongated (central) straight and/or linear portion or edge, first-tier grill rack 101*a* may be shorter or smaller (front-to-back) than third-tier grill rack 101*c* because of its location corresponding to rounded and/or curved top portion or edge.

In addition, second-tier grill rack 101*b* may be disposed at a height between first-tier grill rack 101*a* and third-tier grill rack 101*c*, and likewise have a depth (front-to-back) that is between the depths of first-tier grill rack 101*a* and third-tier grill rack 101*c*. Accordingly, the grill rack system 100 may have opera-house or stadium seating-type configuration with each of the upper level grill racks 101 having a progressively shorter or smaller depth (front-to-back) and/or a progressively recessed front and/or rear edge (compared to the grill rack immediately there below). In other words, third-tier grill rack 101*c* may be larger than second-tier grill rack 101*b*, which may be larger than first-tier grill rack 101*a*.

Such configurations may permit and/or allow for a suitable amount of cooking area between the upper surface of a lower grill rack 101 and the lower surface of an upper grill rack 101. For instance, such configurations may permit and/or allow for flipping and/or rotating of food products without the substantial risk of touching an adjacent grill rack and/or being burned thereby. The combination of grill racks 101 of varying depths and rack track guides 109 serving as channels for the grill racks 101 provides users with a greater amount of cooking area both inside and outside the grill housing 130. It is noted, however, that each of the grill racks 101 can have substantially the same width or length (side-to-side) and/or height (i.e., top-to-bottom).

Figure 9:
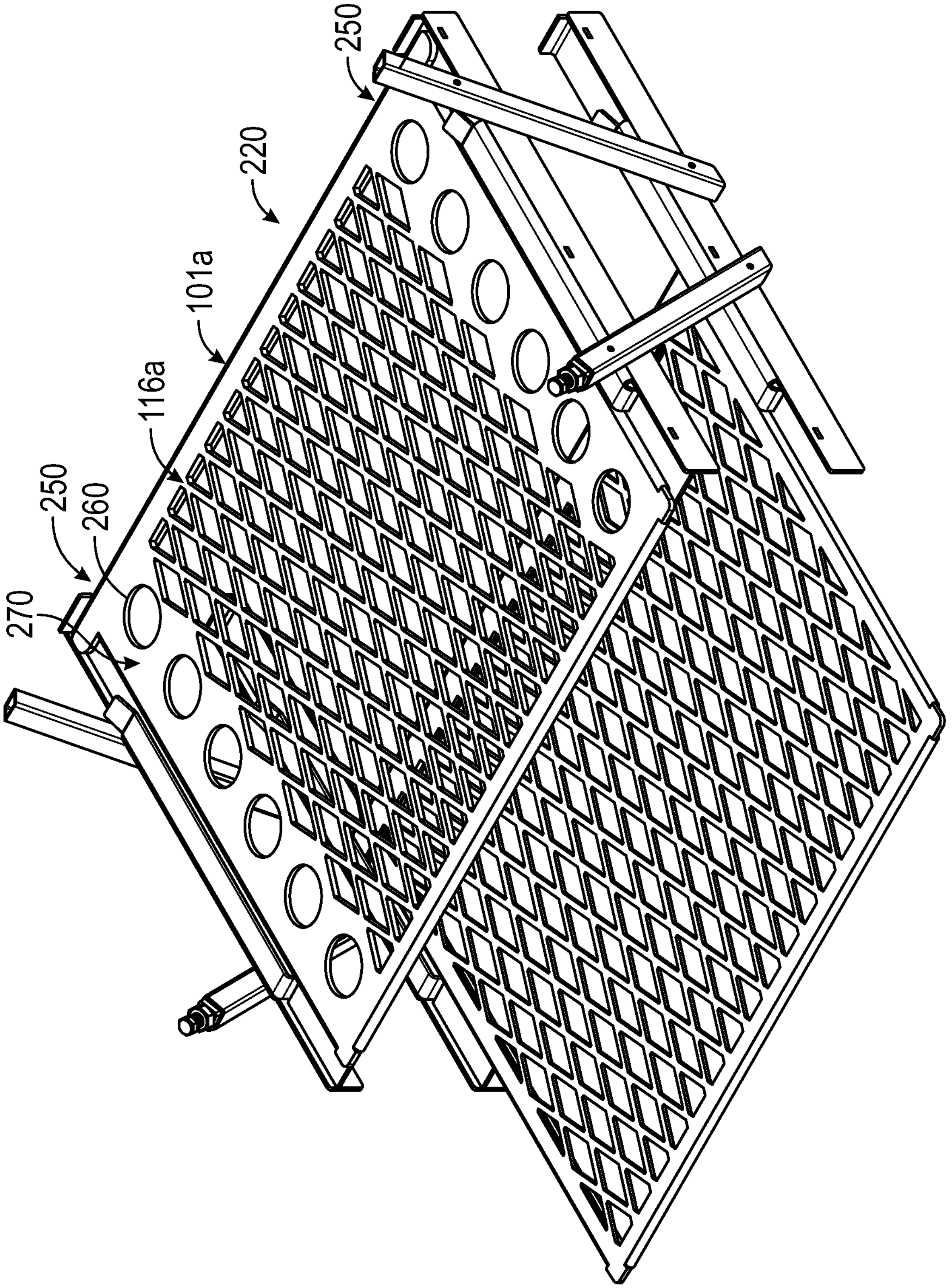
FIG. 9 is a perspective view of an embodiment of a jalapeno holder rack shown on the grill rack system.

With reference to FIGS. 9-12, a variety of accessory racks 220, 230, 240, 245 for the grill rack system 100 will be described. Like elements of the accessory racks 220, 230, 240, 245 to the grill rack 101 shown and described with respect to FIGS. 5A and 5B are shown with an "a" suffix and the prior description is incorporated herein. FIG. 9 illustrates an embodiment of a jalapeno holder accessory rack 220. The jalapeno holder accessory rack 220 includes opposite side portions 250 that flank steel grating 116*a* with a plurality of holes 260 therein that serve as jalapeno holders 270 integrated with the rack 101*a*. FIG. 10 illustrates an embodiment of a rib holder accessory rack 230. The rib holder accessory rack 230 includes rib separators/dividers 280 integrated with the rack 101*a* that the ribs sit on the rack 101*a* between for grilling the ribs. FIG. 11 illustrates an embodiment of a beer can accessory rack 240. The beer can accessory rack 240 includes can/container 290 integrated with the rack 101*a* that items to be cooked/heated sit within for cooking/heating the items. FIG. 12 illustrates an embodiment of a drumstick holder accessory rack 245. The drumstick holder accessory rack 245 includes a plurality of drumstick holder assemblies 300, each with a plurality of curved drumstick holder members 310, integrated with the rack 101*a* that drumsticks are held within for grilling the drumsticks. Although the accessory racks 220, 230, 240, 245 are shown with the rack 101*a* for use with a closed-track system (e.g., closed-track grill rack shelf 105, rack track guide 109, and channel 170 with stop 113) as shown and/or described herein, in alternative embodiments, the accessory rack(s) 220, 230, 240, 245 may be used with an open-track system.

The foregoing description and drawings comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing descriptions and the associated drawings. Although specific terms may be employed herein, they are used in a generic and descriptive sense only and not for purposes of limitation. Accordingly, the present invention is not limited to the specific embodiments illustrated herein, but is limited only by the following claims.

We claim:

1. A grill rack system, comprising:
- at least one grill rack; and
- a left-hand grill bracket and a right-hand grill bracket each including only one set bolt,
- wherein each of the right-hand grill bracket and the left-hand grill bracket comprises:
  - a bracket frame including a plurality of braces and a plurality of shelves, each transverse to each of the braces and each having a rack track guide;
  - at least one fine-tuning adjustment screw attached to the grill bracket that can be expanded or retracted;
  - a bottom one of the shelves having raised legs,
- wherein each of the right-hand grill bracket and the left-hand grill bracket comprises a smoke bar hanging bracket attached to an open frame where each bracket is arrow-shaped with recesses incrementally positioned along the bracket to receive and rest the end of a skewer.

2. The grill rack system of claim 1, wherein the at least one grill rack comprises:
- a frame with cut corners and cut openings for grate installation;
- an embedded expanded steel grating surrounded by the frame; and
- a raised edge on one side of the rack that increases the depth between the top of the frame and the grating.

3. The grill rack system of claim 1, wherein the grill rack system includes a front adjacent to where a grill opens and a user accesses a grill and a rear, each of the right-hand grill bracket and the left-hand grill bracket includes at least one rack track guide, each defining a rack track guide opening, the at least one rack track guide defines a channel including a closed front end-point of the channel located closer to the front of the grill rack system than the rear of the grill rack system, and an open rear located closer to the rear of the grill rack system than the front of the grill rack system, the rack track guide opening accessing the open rear of the channel, the grill rack configured to slide over and into the rack track guide opening and movable in a forward direction until the grill rack reaches the end-point of the channel, allowing a substantial portion of the grill rack and food product thereon to be accessible by a user in front of a grill without substantial risk of touching an adjacent grill rack and/or being burned.

4. The grill rack system of claim 3, wherein the at least one rack track guide includes an upper track support and a lower track support parallel with the upper track support, the upper track support terminating at the rack track guide opening in upwardly angled flange, the grill rack configured to slide rearward up and over the upwardly angled flange and into the rack track guide opening.

5. The grill rack system of claim 1, wherein the set bolt attaches to the top-most point of only one of the braces that can be loosened or tightened.

6. The grill rack system of claim 1, wherein one of the right-hand grill bracket and the left-hand grill bracket includes a rotisserie bracket attached to one of the shelves having a central recess to receive and rest an end of a skewer.

7. A grill rack system, comprising:
- at least one grill rack; and
- a left-hand grill bracket and a right-hand grill bracket each including at least one rack track guide each defining a rack track guide opening,
- wherein the grill rack system includes a front adjacent to where a grill opens and a user accesses a grill and a rear, the at least one rack track guide defines a channel including a closed front end-point of the channel located closer to the front of the grill rack system than the rear of the grill rack system, and an open rear located closer to the rear of the grill rack system than the front of the grill rack system, the rack track guide opening accessing the open rear of the channel, the grill rack configured to slide over and into the rack track guide opening and movable in a forward direction until the grill rack reaches the end-point of the channel, allowing a substantial portion of the grill rack and food product thereon to be accessible by a user in front of a grill without substantial risk of touching an adjacent grill rack and/or being burned, the at least one rack track guide includes an upper track support and a lower track support parallel with the upper track support, the upper track support terminating at the rack track guide opening in upwardly angled flange, the grill rack configured to slide rearward up and over the upwardly angled flange and into the rack track guide opening.

8. The grill rack system of claim 7, wherein the at least one grill rack comprises:
- a frame including cut corners and cut openings;
- an embedded expanded steel grating surrounded by the frame and including edges disposed in the openings; and
- the frame having a raised edge on one side of the rack that increases the depth between the top of the frame and the grating allowing for a recessed grilling surface when the grill rack is reversed.

9. The grill rack system of claim 7, wherein each of the right-hand grill bracket and the left-hand grill bracket comprises:
- a bracket frame including a plurality of braces and a plurality of shelves, each transverse to each of the braces and each including the rack track guide;
- a set bolt attached to the top-most point of only one of the braces that can be loosened or tightened;
- a set of fine-tuning adjustment screws attached to the plurality of braces that can be expanded or retracted; and
- a bottom one of the shelves having raised legs.

10. The grill rack system of claim 9, wherein each of the right-hand grill bracket and the left-hand grill brackets comprises:

a rotisserie bracket attached to one of the shelves including a central recess to receive and rest an end of a skewer; and a smoke bar hanging bracket attached to an open frame where each bracket is arrow-shaped with recesses incrementally positioned along the bracket to receive and rest the end of the skewer.

11. A grill rack system, comprising:

at least one grill rack with opposite sides and having at least one rear crossmember alignment tab extending from at least one of the opposite sides;

a left-hand grill bracket and a right-hand grill bracket each including at least one rack track guide each defining a rack track guide opening and each including the at least one alignment tab disposed in the at least one rack track guide, wherein the grill rack system includes a front adjacent to where a grill opens and a user accesses a grill and a rear, the at least one rack track guide defines a channel including a closed front end-point of the channel located closer to the front of the grill rack system than the rear of the grill rack system, and an open rear located closer to the rear of the grill rack system than the front of the grill rack system, the rack track guide opening accessing the open rear of the channel, the at least one rear crossmember alignment tab of the grill rack configured to slide over and into the rack track guide opening and movable in a forward direction until the grill rack reaches the end-point of the channel, allowing a substantial portion of the grill rack and food product thereon to be accessible by a user in front of a grill without substantial risk of touching an adjacent grill rack and/or being burned, the at least one rack track guide includes an upper track support and a lower track support parallel with the upper track support, the upper track support terminating at the rack track guide opening in upwardly angled flange, the at least one rear crossmember alignment tab of the grill rack configured to slide rearward up and over the upwardly angled flange and into the rack track guide opening.

12. The grill rack system of claim 11, wherein the at least one grill rack comprises:

a frame with cut corners and cut openings for grate installation;

an embedded expanded steel grating surrounded by the frame; and a raised edge on one side of the rack that increases the depth between the top of the frame and the grating.

13. The grill rack system of claim 11 wherein each of the right-hand grill bracket and the left-hand grill bracket comprises:

a bracket frame including a plurality of braces and a plurality of shelves, each transverse to each of the braces and each including the rack track guide;

a set bolt attached to the top-most point of only one of the braces that can be loosened or tightened;

at least one fine-tuning adjustment screw attached to the grill bracket that can be expanded or retracted; and a bottom one of the shelves having raised legs.

14. The grill rack system of claim 13, wherein each of the right-hand grill bracket and the left-hand grill bracket comprises:

a rotisserie bracket attached to one of the shelves having a central recess to receive and rest an end of a skewer; and a smoke bar hanging bracket attached to an open frame where each bracket is arrow-shaped with recesses incrementally positioned along the bracket to receive and rest the end of the skewer.

15. The grill rack system of claim 11, wherein the at least one grill rack is an accessory rack with a food holder integrated with the grill rack and configured to be used with at least one of a closed-track grill rack shelf and an open-track grill rack shelf.

16. The grill rack system of claim 15, wherein the accessory rack is one of a jalapeno holder accessory rack, a rib holder accessory rack, a beer can accessory rack, and a drumstick holder accessory rack.

* * * * *